United States Patent [19]

Kohno et al.

[11] Patent Number: 4,997,238
[45] Date of Patent: Mar. 5, 1991

[54] BRAKE PRESSURE CONTROL DEVICE FOR VEHICLES

[75] Inventors: Teruhisa Kohno; Koichi Hashida; Koji Takata, all of Itami, Japan

[73] Assignee: Sumitomo Electric Industries, Ltd., Osaka, Japan

[21] Appl. No.: 349,930

[22] Filed: May 9, 1989

Related U.S. Application Data

[63] Continuation of Ser. No. 115,450, Oct. 30, 1987, abandoned.

[30] Foreign Application Priority Data

Oct. 31, 1986 [JP] Japan ................. 61-261075

[51] Int. Cl.$^5$ ............................... B60T 8/00
[52] U.S. Cl. ................................ 303/119; 303/113
[58] Field of Search ............. 303/113, 80, 115, 119, 303/114, 116, 117

[56] References Cited

U.S. PATENT DOCUMENTS

| | | | |
|---|---|---|---|
| 3,617,098 | 11/1971 | Leiber | 303/21 F |
| 3,857,614 | 12/1974 | Kurichh . | |
| 4,462,642 | 7/1984 | Leiber | 303/119 |
| 4,579,146 | 4/1986 | Tsuru et al. . | |
| 4,619,289 | 10/1986 | Tsuru et al. . | |
| 4,685,747 | 8/1987 | Belart et al. | 303/114 |
| 4,687,259 | 8/1987 | Reinartz et al. | 303/114 |
| 4,738,493 | 4/1988 | Inagaki et al. | 303/116 |

FOREIGN PATENT DOCUMENTS

| | | | |
|---|---|---|---|
| 1655449 | 1/1972 | Fed. Rep. of Germany . | |
| 1555520 | 4/1972 | Fed. Rep. of Germany . | |
| 2945444 | 5/1981 | Fed. Rep. of Germany . | |
| 3107963 | 1/1982 | Fed. Rep. of Germany . | |
| 3134155 | 4/1982 | Fed. Rep. of Germany | 303/116 |
| 3440363 | 5/1985 | Fed. Rep. of Germany . | |
| 3626679 | 2/1988 | Fed. Rep. of Germany | 303/114 |
| 2187521 | 9/1987 | United Kingdom | 303/114 |

OTHER PUBLICATIONS

Japanese Patent Laying-Open Gazette No. 202142/1983, pp. 239 to 242, Laying open date: Nov. 25, 1983.

Primary Examiner—Robert P. Olszewski
Assistant Examiner—Mark T. Le
Attorney, Agent, or Firm—W. G. Fasse; D. H. Kane, Jr.

[57] ABSTRACT

A brake pressure control device for vehicles is arranged in a pipeline connecting a master cylinder (22) and a wheel brake (23) with an electromagnetic directional control valve (24) which is switchable to any one of a plurality of valve positions by electromagnetic force. The electromagnetic directional control valve (24) is switched between a first valve position and a second valve position. Bidirectional flow of fluid is allowed when the electromagnetic directional control valve is in the first valve position. Unidirectional flow of the fluid is allowed but a reverse flow of the fluid is prevented when the electromagnetic directional control valve is in the second valve position.

8 Claims, 9 Drawing Sheets

BRAKE PRESSURE CONTROL DEVICE FOR VEHICLES

This application is a File Wrapper Continuation of application Ser. No.: 07/115,450, filed Oct. 30, 1987, now abandoned.

BACKGROUND OF THE INVENTION

1. Field of the Invention

The present invention relates to a brake pressure control device for vehicles for controlling the brake pressure to provide, e.g. an antilocking function, a traction control, an automatic brake control for a vehicle-to-vehicle distance control, an automatic brake control for an obstacle avoidance, etc.

2. Description of the Prior Art

As the simplest method of controlling brake pressure for antilocking control, traction control, automatic brake control for vehicle-to-vehicle distance control, automatic brake control for obstacle avoidance etc., it is well known to provide an electromagnetic directional control valve, which is switched in a plurality of positions by an electromagnetic force, in a pipeline connecting a master cylinder and a wheel brake. A typical brake pressure control device for an antilocking control is disclosed in U.S. Pat. No. 3,617,098, for example. Present FIG. 1 is a hydraulic pressure circuit diagram of the brake pressure control device as disclosed in U.S. Pat. No. 3,617,098.

Referring to FIG. 1, an electromagnetic directional control valve 4, which is switched between two positions by an electromagnetic force, is arranged in a pipeline connecting a master cylinder 2 for converting an operating force of a brake pedal 1 into a hydraulic pressure for a wheel brake 3. An auxiliary power circuit 5 is connected in parallel with the electromagnetic directional control valve 4. A pump 7 is arranged in the auxiliary power circuit 5, to be driven by a motor 6. An electromagnetic directional control valve 8, which is switched between two positions by an electromagnetic force, and a reservoir 9 are further arranged in the auxiliary power circuit 5, as shown in FIG. 1. A check valve 10 is connected in a circuit 11 which is arranged in parallel with the electromagnetic directional control valve 4. The check valve 10 allows flow of fluid from the wheel brake 3 to the master cylinder 2, while preventing reverse flow of the fluid.

It is assumed here that an antilocking signal is generated when the brake pedal 1 is operated in the hydraulic pressure circuit as shown in FIG. 1. The positions of the electromagnetic directional control valves 4 and 8 are suitably switched by the signal. Pressure against the wheel brake 3 is reduced when both of the electromagnetic directional control valves 4 and 8 are energized and retained when only the electromagnetic directional control valve 4 is energized, while being increased when the electromagnetic directional control valves 4 and 8 are not energized. Under such antilocking control, the pressure against the wheel brake 3 is controlled to be lower than that of the master cylinder 2. However, when the driver relaxes the operating force against the brake pedal 1 for relaxing the braking force during the control, the brake pressure must be lowered responsively. The check valve 10 is provided in order to satisfy such requirement. If, for example, the operating force against the brake pedal 1 is relaxed when the electromagnetic directional control valve 4 is energized, the pressure of the master cylinder 2 becomes lower than that against the wheel brake 3, whereby the fluid passes through the check valve 10 to flow toward the master cylinder 2. Thus, the brake pressure against the wheel brake 3 is also lowered in response to relaxation of the operating force by the brake pedal 1.

If, in an automatic brake control system the brake pedal 1 is not operated in the automatic mode for a traction control or vehicle-to-vehicle distance control, for example, because the driver operates the brake pedal 1, the pressure against the wheel brake 3 must be increased so that the pressure against the wheel brake 3 is higher than the automatic control pressure. Such an operation is required in a quick braking action of the beginning of a traction control, for example. In order to satisfy such a requirement, it is necessary to provide another check valve, which is effective in a direction opposite to that of the check valve 10, in the hydraulic pressure circuit as shown in FIG. 1. The newly provided check valve is adapted to allow flow of the fluid from the master cylinder 2 to the wheel brake 3 while preventing a reverse flow. When the brake pedal 1 is operated in such circuit structure, the pressure against the wheel brake 3 is also increased responsively.

A device not employing any check valve is also proposed in the art as a system for varying the pressure against a wheel brake with a change in the operating force of a brake pedal during an antilocking control or a traction control. In U.S. Pat. No. 4,462,642, hydraulic pressure sensors are arranged in front and at the back of a cutoff valve, which is connected in a pipeline connecting a master cylinder and a wheel brake, to compare hydraulic pressure levels on both sides of the cutoff valve with each other, whereby the operation of the cutoff valve is controlled in response to the hydraulic pressure levels.

In the brake pressure control device as shown in FIG. 1, the check valve 10 must be connected in parallel with the electromagnetic directional control valve 4. Thus, the circuit structure and pipe arrangement are complicated, leading to economic loss and reduced reliability.

Japanese Patent Laying-Open Gazette No. 202142/1983 also discloses a brake pressure control device having a check valve connected in parallel with an electromagnetic directional control valve. This brake pressure control device is also complicated in its circuit structure, similarly to the brake pressure control device of U.S. Pat. No. 3,617,098 as shown in FIG. 1.

In particular, a rather complicated circuit structure is required in order to vary the pressure against the wheel brake in response to a change in the operating force of the brake pedal when an antilocking control is performed while the brake pedal is being operated and when a traction control performed while the brake pedal is not being operated.

Further, when hydraulic pressure sensors are provided on both sides of a cutoff valve as in the brake pressure control device disclosed in U.S. Pat. No. 4,462,642, the total cost of the entire device is increased since the hydraulic sensors etc. are expensive.

SUMMARY OF THE INVENTION

The present invention has been proposed in view of the above circumstances, and it is an object of the invention to provide a brake pressure control device with a simple circuit structure, in which brake pressure against a wheel brake can be changed is response to a change in the hydraulic pressure of a master cylinder when a brake pedal is operated in an antilocking control etc. or when the brake pedal is not operated in a traction control etc. Preferably, the present invention is directed to implement a brake pressure control device that is applicable to an antilocking control and a traction control and which has a simple structure, in which the brake pressure against a wheel brake can be changed in response to a change in the hydraulic pressure of a master cylinder in an antilocking control situation and in traction control.

The present invention is directed to a brake pressure control device for vehicles, which is provided with an electromagnetic directional control valve switchable in a plurality of valve positions by an electromagnetic force in a pipeline connecting a master cylinder and a wheel brake. The feature of the present invention resides in that the electromagnetic directional control valve itself has a valve position for allowing only unidirectional flow of fluid while preventing a reverse flow.

According to the present invention, a check valve is not fixedly provided in a pipeline as in the conventional case but selectively positioned in the pipeline or outside the pipeline by an electromagnetic force, whereby the entire circuit structure and pipe arrangement are simplified to improve the system's reliability while also reducing its costs. When it is necessary to change the brake pressure against a wheel brake following a change in the master cylinder pressure in an antilocking control or in a traction control etc., an electromagnetic directional control valve may be driven to locate the check valve in the pipeline.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
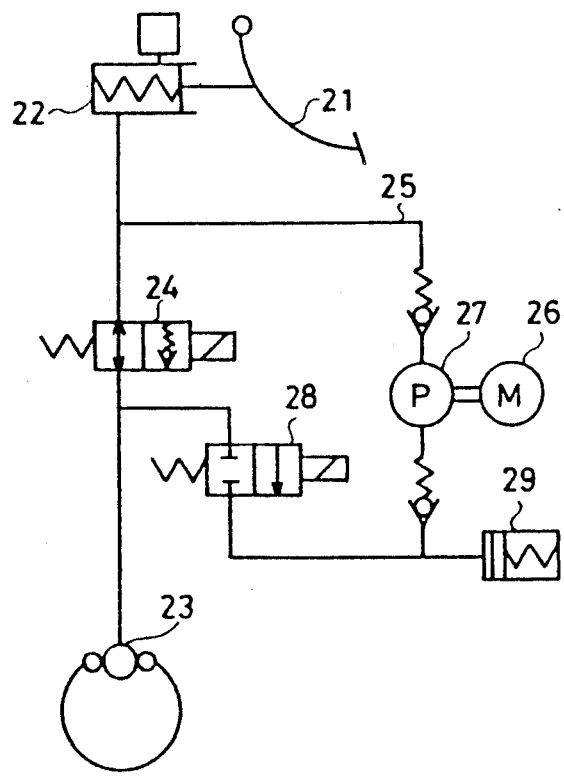
FIG. 2 is a hydraulic pressure circuit diagram of a first embodiment according to the present invention.

FIG. 2 is a hydraulic pressure circuit diagram showing a first embodiment of the present invention. An electromagnetic directional control valve 24 is provided in a pipeline connecting a master cylinder 22 with a wheel brake 23. The master cylinder converts an operating force applied by a brake pedal 21 into hydraulic pressure for application to the wheel brake 23. This electromagnetic directional control valve 24 is switched between a first valve position and a second valve position by electromagnetic force. Bidirectional flow of fluid is allowed when the electromagnetic directional control valve 24 is in the first valve position as shown in FIG. 2. On the other hand, flow of the fluid from the wheel brake 23 to the master cylinder 22 is allowed but reverse flow is prevented when the electromagnetic directional control valve 24 is switched to the second valve position.

An auxiliary power circuit 25, which is connected in parallel with the electromagnetic directional control valve 24, is provided therein with a pump 27 driven by a motor 26, an electromagnetic directional control valve 28 and a reservoir 29.

In order to perform a general brake operation by the brake pedal 21 or re-pressurization in an antilocking control, the electromagnetic directional control valve 24 is brought into the first valve position as shown in FIG. 2. On the other hand, the electromagnetic directional control valve 24 is energized to bring the same into the second valve position, in order to reduce or retain a brake pressure against the wheel brake 23 in an antilocking control operation. In this case, the operating force applied by the brake pedal 21 is so relaxed that the hydraulic pressure of the master cylinder 22 is lower than the brake pressure against the wheel brake 23, whereby the fluid flows through the electromagnetic directional control valve 24. Namely, the brake pressure against the wheel brake 23 is lowered following a reduction in the hydraulic pressure of the master cylinder 22.

Figure 3:
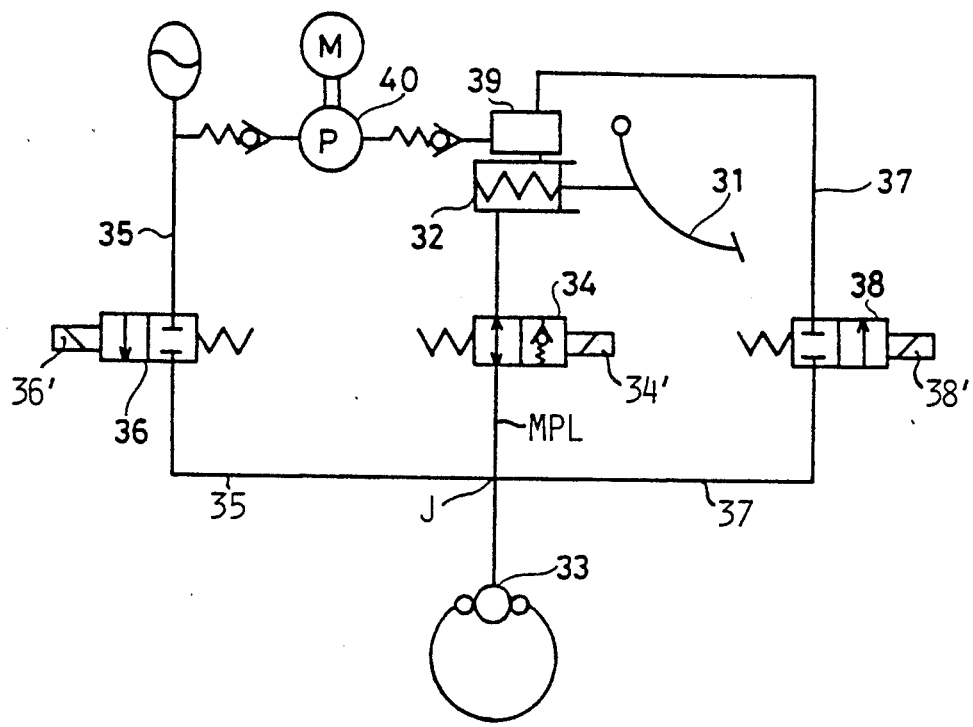
FIG. 3 is a hydraulic pressure circuit diagram of a second embodiment according to the present invention.

FIG. 3 is a hydraulic pressure circuit diagram showing a second embodiment according to the present invention.

An electromagnetic directional control valve 34 having electromagnetic drive means 34' is connected in a main pipeline MPL connecting a master cylinder 32 for converting an operating force applied by a brake pedal 31, into hydraulic pressure, to a wheel brake 33. The electromagnetic directional control valve 34 is switched between first and second valve positions by an electromagnetic force generated by the drive means 34'. Bidirectional flow of fluid is allowed when the electromagnetic directional control valve 34 is in the first valve position as shown in FIG. 3. On the other hand, flow of the fluid from the master cylinder 32 to the wheel brake 33 is allowed but reverse flow is prevented when the electromagnetic directional control valve 34 is brought into the second valve position. An auxiliary power circuit or auxiliary pipeline 35 is provided in parallel with the electromagnetic directional control valve 34. The auxiliary power circuit or auxiliary pipeline 35 includes an auxiliary electromagnetic directional control valve 36 operated by an electromagnetic drive 36.

A pump 40 in the auxiliary power circuit 35 sucks working fluid from a reservoir 39 to pressurize the auxiliary power circuit 35. As shown in FIG. 3, an electromagnetic directional control valve 38 is provided in a drain circuit 37 which communicates with the reservoir 39 and with a junction J to which the main pipeline MPL, the auxiliary pipeline 35, and the wheel brake 33 are also connected. The valve 38 in the drain pipeline 37 is controlled by an electromagnetic drive 38′.

In order to perform an automatic brake control for a traction control or a stop retention when the brake pedal is not operated the electromagnetic directional control valve 34 is brought into the second valve position. On the other hand, when a brake pedal 31 is operated in this state, hydraulic pressure of in the master cylinder 32 exceeds the brake pressure against the wheel brake 33, whereby the fluid flows through the electromagnetic directional control valve 34 to the wheel brake. Thus, when the brake pedal 31 is operated for a traction control or for an automatic brake control, the brake pressure against the wheel brake 33 is increased responsively.

Figure 4:
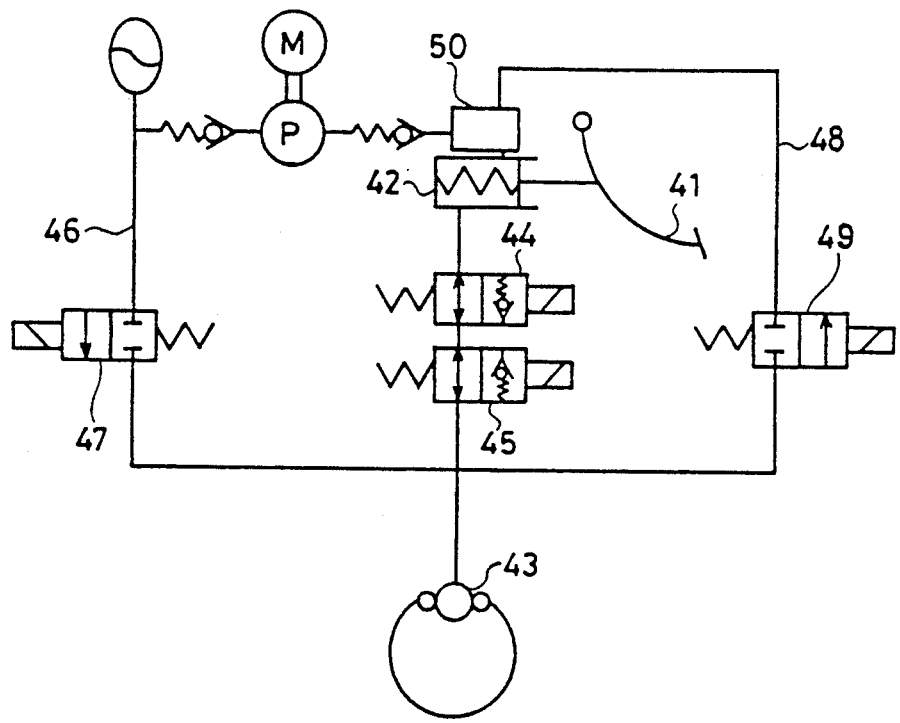
FIG. 4 is a hydraulic pressure circuit diagram of a third embodiment according to the present invention.

FIG. 4 is a hydraulic pressure circuit diagram showing a third embodiment according to the present invention.

Two electromagnetic directional control valves 44 and 45 are connected in series in a pipeline connecting a master cylinder 42 for converting operating force by a brake pedal 41 into hydraulic pressure, to a wheel brake 43. The electromagnetic directional control valve 44 is switched between a first valve position for allowing a bidirectional flow of fluid and a second valve position for allowing flow of the fluid from the wheel brake 43 to the master cylinder 42 while preventing reverse flow. The other electromagnetic directional control valve 45 is switched between a first valve position for allowing a bidirectional flow of the fluid and a second valve position for allowing a flow of the fluid from the master cylinder 42 to the wheel brake 43 while preventing a reverse flow.

An auxiliary power circuit 46, which sucks working fluid from a reservoir 50 to pressurize the same, is provided with an electromagnetic directional control valve 47. As shown in FIG. 4, an electromagnetic directional control valve 49 in a drain circuit 48 communicates with the reservoir 50.

In order to perform a general brake operation by the brake pedal 41, both of the electromagnetic directional control valves 44 and 45 are brought into the first valve positions as shown in FIG. 4.

In order to perform a antilocking control with the brake pedal 41 being operated, the electromagnetic directional control valve 44 is energized to bring the same into the second valve position. In this case, the other electromagnetic directional control valve 45 is in the first valve position as shown in FIG. 4. When the operating force applied by the brake pedal 41 is relaxed in this state, the fluid acting on the wheel brake 43 passes through the electromagnetic directional control valves 45 and 44 to flow toward the master cylinder 42. Thus, the brake pressure against the wheel brake 43 is reduced following a relaxation of the operating force applied by the brake pedal 41.

In order to perform a traction control etc. in a state when the brake pedal 41 is not operated, the electromagnetic directional control valve 45 is energized to bring the same into the second valve position. In this case, the electromagnetic directional control valve 44 is in the first valve position as shown in FIG. 4. When the brake pedal 41 is operated in this state, the fluid delivered from the master cylinder 42 passes through the electromagnetic directional control valves 44 and 45 to flow toward the wheel brake 43. During such traction control etc., the brake pressure against the wheel brake 43 is increased following an increase in the hydraulic pressure of the master cylinder 42.

Figure 5:
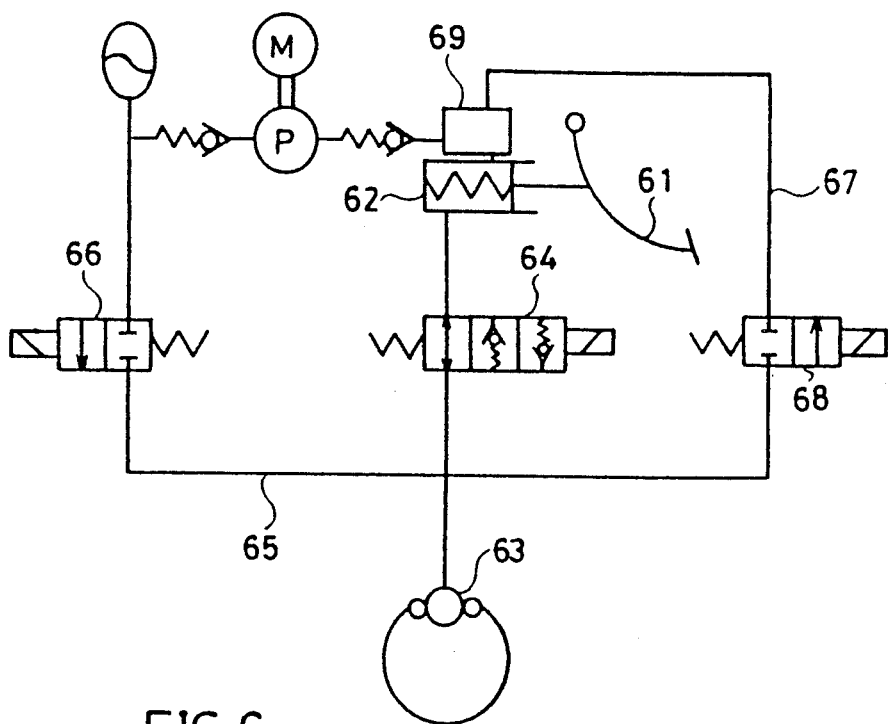
FIG. 5 is a hydraulic pressure circuit diagram of a fourth embodiment according to the present invention.

FIG. 5 is a hydraulic pressure circuit diagram showing a fourth embodiment according to the present invention.

An electromagnetic directional control valve 64, which is switchable into any one of three positions by electromagnetic force, is arranged in a pipeline connecting a master cylinder 62 for converting an operating force applied by a brake pedal 61 into a hydraulic pressure and a wheel brake 63. Bidirectional flow of fluid is allowed when the electromagnetic directional control valve 64 is in a first valve position as shown in FIG. 5. Flow of the fluid from the master cylinder 62 to the wheel brake 63 is allowed but a reverse flow is prevented when the electromagnetic directional control valve 64 is brought into a second valve position. Further, flow of the fluid from the wheel brake 63 to the master cylinder 62 is allowed but a reverse flow is prevented when the electromagnetic directional control valve 64 is switched to a third valve position.

An auxiliary power circuit 65, which sucks working fluid from a reservoir 69 to pressurize circuit 65, is provided with an electromagnetic directional control valve 66. An electromagnetic directional control valve 68 is provided in a drain circuit 67, which communicates with the reservoir 69.

In order to perform a general brake operation, the electromagnetic directional control valve 64 is brought into the first valve position as shown in FIG. 5.

In order to perform an antilocking control when the brake pedal 61 is operated, the electromagnetic directional control valve 64 is brought into the third valve position. When the operating force of the brake pedal 61 is relaxed in this state, the fluid acting on the wheel brake 63 passes through the electromagnetic directional control valve 64 to flow toward the master cylinder 62. Thus, the brake pressure against the wheel brake 63 is reduced following relaxation of the operating force of the brake pedal 61.

In order to perform a traction control etc. when the brake pedal 61 is not operated, the electromagnetic directional control valve 64 is brought into the second valve position. When the brake pedal 61 is operated in this state, the fluid delivered from the master cylinder 62 passes through the electromagnetic directional control valve 64 to flow toward the wheel brake 63. When the brake pedal 61 is thus operated during the traction control etc., the brake pressure against the wheel brake 63 is increased responsively.

Figure 6:
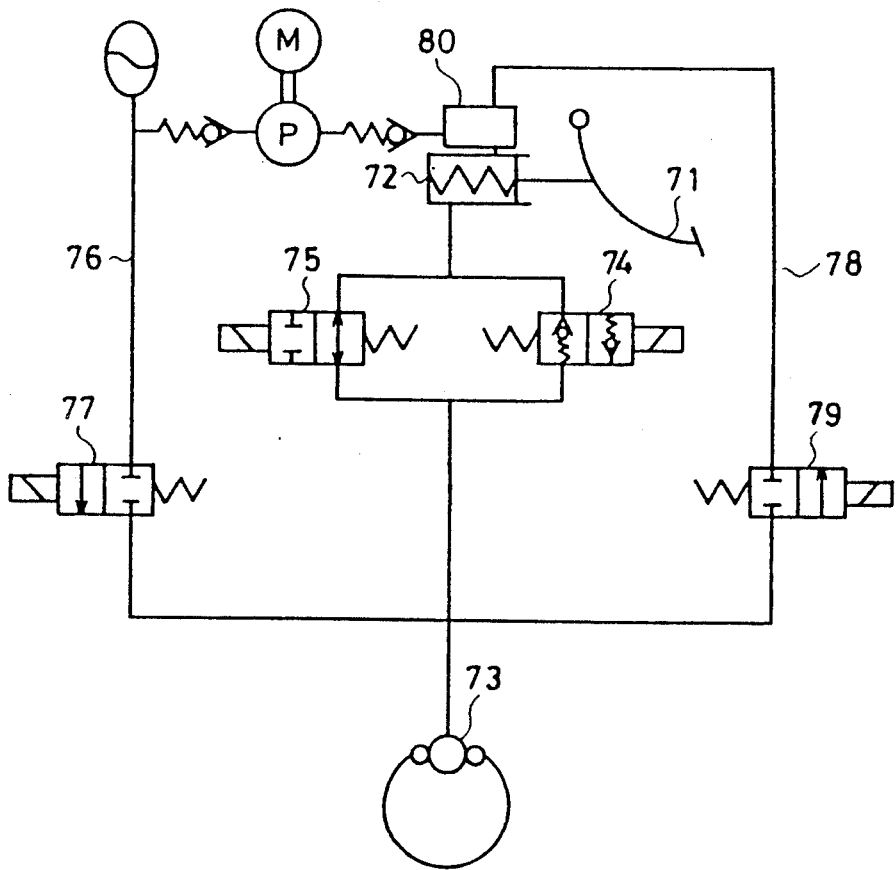
FIG. 6 is a hydraulic pressure diagram of a fifth embodiment according to the present invention.

FIG. 6 is a hydraulic pressure circuit diagram showing a fifth embodiment according to the present invention.

An electromagnetic directional control valve 74, which is switchable between first and second valve positions, is arranged in a pipeline connecting a master cylinder 72 for converting an operating force into a hydraulic pressure with a wheel brake 73. Flow of fluid from the master cylinder 72 to the wheel brake 73 is allowed but a reverse flow is prevented when the electromagnetic directional control valve 74 is in the first valve position as shown in FIG. 6. On the other hand, flow of the fluid from the wheel brake 73 to the master cylinder 72 is allowed but reverse flow is prevented when the electromagnetic directional control valve 74 is brought into the second valve position.

As shown in FIG. 6, a directional control valve 75, which is switched between two positions by an electromagnetic force, is connected in parallel with the electromagnetic directional control valve 74. This directional control valve 75 allows a bidirectional flow of the fluid when the same is in a first valve position as shown in FIG. 6. The directional control valve 75 is brought into a second valve position to prevent the bidirectional flow of the fluid.

An auxiliary power circuit 76, which sucks working fluid from a reservoir 80 to pressurize the circuit 76 has an electromagnetic directional control valve 77. An electromagnetic directional control valve 79 is arranged in a drain circuit 78, which communicates with the reservoir 80.

In order to perform a general brake operation, the electromagnetic directional control valve 74 is brought into the first valve position and the directional control valve 75 is also brought into the first valve position, as shown in FIG. 6.

In order to perform an antilocking control etc. when the brake pedal 71 is operated, the electromagnetic directional control valve 74 is brought into the second valve position and the directional control valve 75 is also brought into the second valve position. When the operating force applied by the brake pedal 71 is relaxed in this state, the fluid acting on the wheel brake 73 passes through the electromagnetic directional control valve 74 and flows toward the master cylinder 72. When the operating force of the brake pedal 71 is thus relaxed in an antilocking control etc., the brake pressure against the wheel brake 73 is reduced responsively.

In order to perform a traction control etc. when the brake pedal 71 is not operated, the electromagnetic directional control valve 74 is brought into the first valve position and the directional control valve 75 is brought into the second valve position. When the brake pedal 71 is operated in this state, the fluid delivered from the master cylinder 72 passes through the electromagnetic directional control valve 74 to flow toward the wheel brake 73. Thus, the brake pressure against the wheel brake 73 is increased following an increase in the operating force applied by the brake pedal 71.

Figure 7:
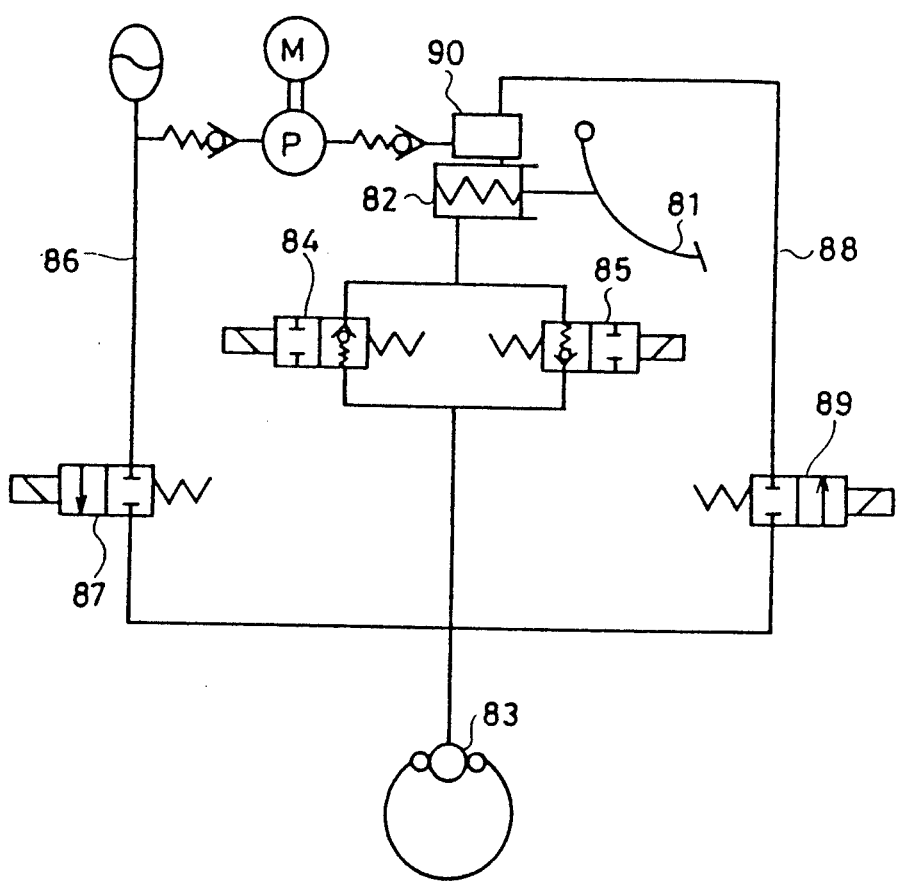
FIG. 7 is a hydraulic pressure circuit diagram of a sixth embodiment according to the present invention.

FIG. 7 is a hydraulic pressure circuit diagram showing a sixth embodiment according to the present invention.

Two electromagnetic directional control valves 84 and 85 are connected in parallel in a pipeline connecting a master cylinder 82 for converting an operating force of a brake pedal 81 into hydraulic pressure, to a wheel brake 83. The electromagnetic directional control valve 84 is switched between a first valve position for allowing a flow of fluid from the master cylinder 82 to the wheel brake 83 while preventing a reverse flow, and a second valve position for preventing a bidirectional flow of the fluid. The other electromagnetic directional control valve 85 is switched between a first valve position for allowing a flow of the fluid from the wheel brake 83 to the master cylinder 82 while preventing a reverse flow, and a second valve position for preventing bidirectional flow of the fluid.

An auxiliary power circuit 86, which sucks working fluid from a reservoir 90 to pressurize the circuit 86 has an electromagnetic directional control valve 87. An electromagnetic directional control valve 89 is provided in a drain circuit 88, which communicates with the reservoir 90.

In order to perform a general brake operation, the electromagnetic directional control valve 84 is brought into the first valve position as shown in FIG. 7, and the other electromagnetic directional control valve 85 is also brought into the first valve position as shown in FIG. 7.

In order to perform an antilocking control, the electromagnetic directional control valve 84 is brought into the second valve position while the other electromagnetic directional control valve 85 is brought into the first valve position. When the operating force applied by the brake pedal 81 is relaxed in this state, the fluid acting on the wheel brake 83 flows through the electromagnetic directional control valve 85. Thus, the brake pressure against the wheel brake 83 is reduced following a relaxation of the operating force of applied by the brake pedal 81.

In order to perform a traction control etc., the electromagnetic directional control valve 84 is brought into the first valve position and the other electromagnetic directional control valve 85 is brought into the second valve position. When the brake pedal 81 is operated in this state, the fluid delivered from the master cylinder 82 flows through the electromagnetic directional control valve 84. Thus, the brake pressure against the wheel brake 83 is increased following an increase in the operating force applied by the brake pedal 81.

Figure 8:
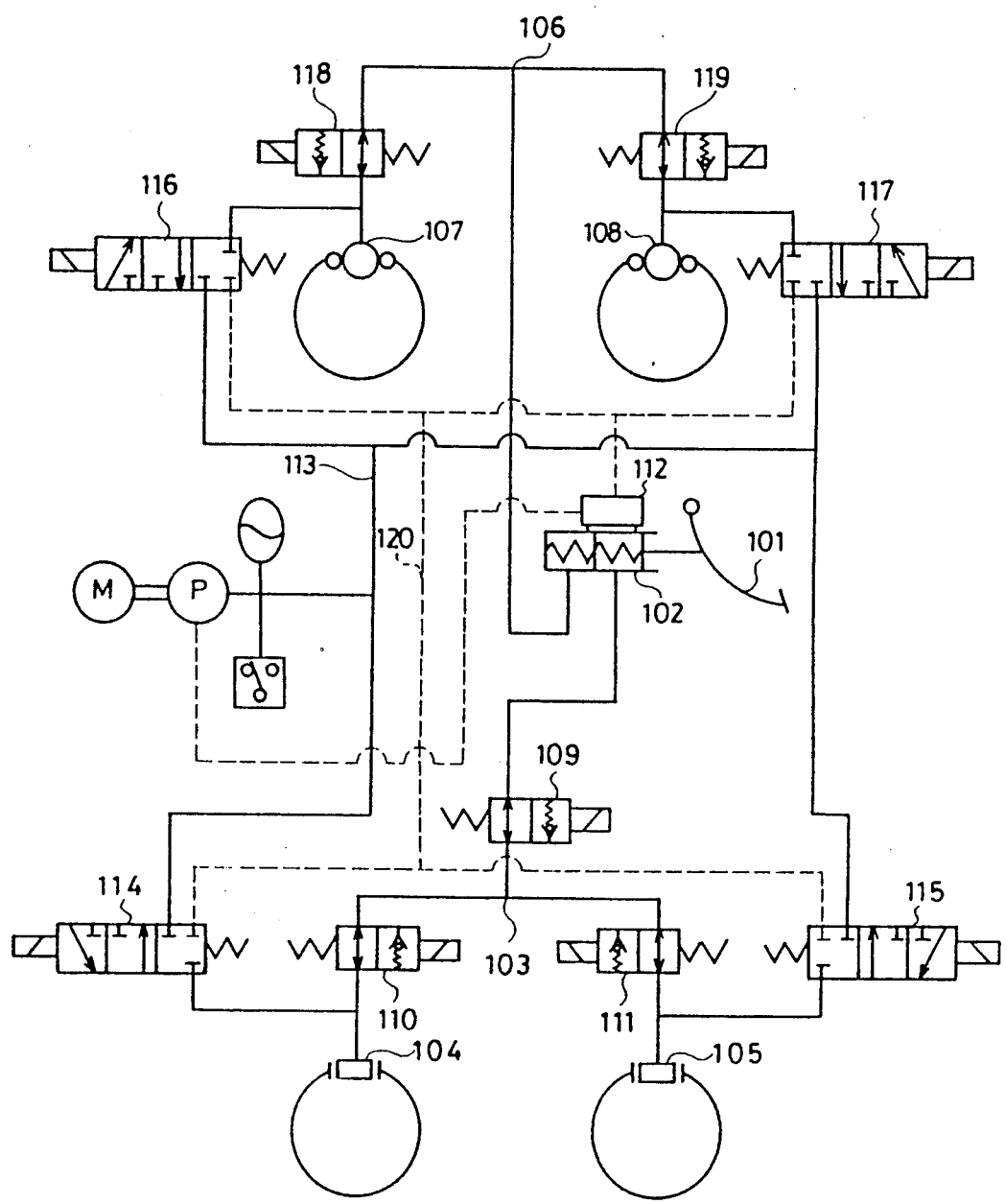
FIG. 8 is a hydraulic pressure circuit diagram showing an example in which the present invention is applied to an FR car.

FIG. 8 is a hydraulic pressure circuit diagram showing such an example that the present invention is applied to an FR car.

A master cylinder 102 for converting an operating force applied by a brake pedal 101, into a hydraulic pressure includes a tandem master cylinder. A first pressurized chamber of the master cylinder 102 communicates through a junction 103 with wheel brakes 104 and 105 for the left and right rear wheels, which are driving wheels. A second pressurized chamber of the master cylinder 102 communicates through a junction 106 with wheel brakes 107 and 108 for the left and right front wheels, which are driven wheels.

An electromagnetic directional control valve 109, which is switched between a first valve position for allowing a bidirectional flow of fluid and a second valve position for allowing a flow of the fluid from the junction 103 to the master cylinder 102 while preventing a reverse flow, is arranged in a pipeline between the first pressurized chamber of the master cylinder 102 and the junction 103. Further, electromagnetic directional control valves 110 and 111, each of which is switchable between a first valve position for allowing a bidirectional flow of the fluid and a second position for allowing a flow of the fluid from the junction 103 to the wheel brake 104 or 105 while preventing reverse flow, are provided in the pipeline between the junction 103 and the wheel brakes 104 and 105 for the left and right rear wheels.

Electromagnetic directional control valves 118 and 119, each of which is switched between a first valve position for allowing a bidirectional flow of the fluid and a second position for allowing a flow of the fluid from the wheel brake 107 or 108 to the junction 106 while preventing reverse flow, are provided in the pipelines between the junction 106 and the wheel brakes 107 and 108 for the left and right front wheels.

An auxiliary power circuit 113, which sucks working fluid from a reservoir 112 to pressurize the circuit 113, communicates with the respective wheel brakes 104, 105, 107 and 108, and electromagnetic directional control valves 114, 115, 116 and 117 are are arranged in the pipelines connecting the auxiliary power circuit 113 with the respective wheel brakes 104, 105, 107 and 108. The electromagnetic directional control valves 114, 115, 116 and 117 communicate with the reservoir 112 through a drain circuit 120.

In order to perform a general brake operation by operating the brake pedal 101, the electromagnetic directional control valves 109, 110, 111, 118 and 119 are brought into the first valve positions as shown in FIG. 8, respectively.

In order to perform an antilocking control when that the brake pedal 101 is operated, the electromagnetic directional control valves 109, 118 and 119 are brought into the second valve positions while the remaining electromagnetic directional control valves 110 and 111 are brought into the first valve positions as shown in FIG. 8. When the operating force of the brake pedal 101 is relaxed in this state, the fluid acting on the wheel brakes 104, 105, 107 and 108 flows toward the master cylinder 101. Consequently, the brake pressure acting upon each of the wheel brakes 104, 105, 107 and 108 is reduced.

In order to perform a traction control when the brake pedal 101 is not operated, the electromagnetic directional control valves 109, 118 and 119 are brought into the first valve positions as shown in FIG. 8, while the remaining electromagnetic directional control valves 110 and 111 are brought into the second valve positions. When the brake pedal 101 is operated in this state, the brake pressure applied to the wheel brakes 104 and 105 for the left and right rear wheels, which are driving wheels, is increased.

Figure 9:
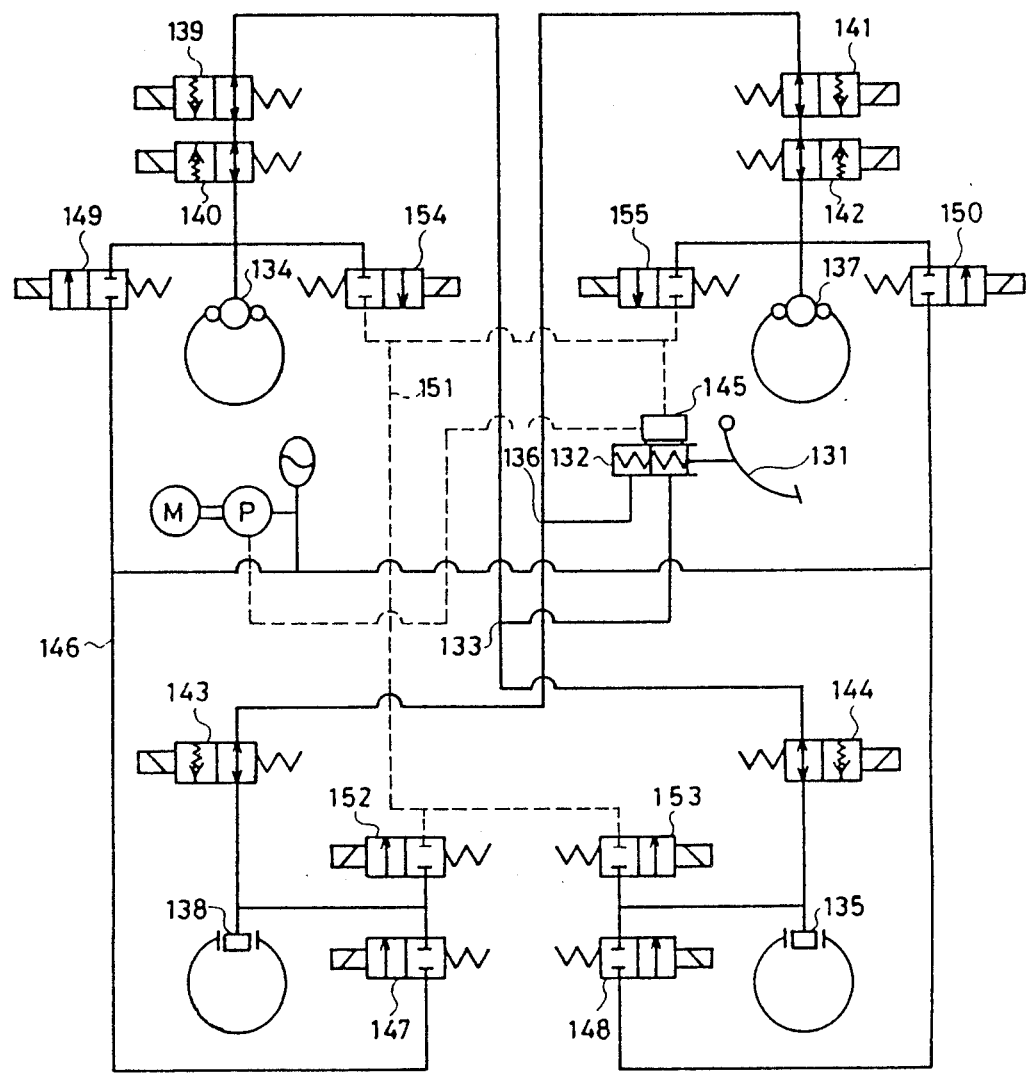
FIG. 9 is a hydraulic pressure circuit diagram showing an example in which the present invention is applied to an FF car.

FIG. 9 is a hydraulic pressure circuit diagram showing such an example that the present invention is applied to diagonal split piping suitable for an FF car.

In this example, a master cylinder 132 for converting an operating force applied by a brake pedal 131 into hydraulic pressure is prepared by a tandem master cylinder. A first pressurized chamber of the master cylinder 132 communicates through a junction 133 with a wheel brake 134 for a left front wheel, which is a driving wheel, and a wheel brake 135 for a right rear wheel, which is a driven wheel. A second pressurized chamber of the master cylinder 132 communicates through a junction 136 with a wheel brake 137 for a right front wheel, which is a driving wheel, and a wheel brake 138 for a left rear wheel, which is a driven wheel.

A pair of electromagnetic directional control valves 139 and 140 and another pair of electromagnetic directional control valves 141 and 142, are arranged in series in the pipelines between the junction 133 and the wheel brake 134 for the left front wheel and between the junction 136 and the wheel brake 137 for the right front wheel. Each of the electromagnetic directional control valves 139 and 141 is switched between a first valve position for allowing a bidirectional flow of fluid and a second valve position for allowing a flow of the fluid from the wheel brake 134 or 137 to the junction 133 or 136 while preventing a reverse flow of the fluid. Each of the remaining electromagnetic directional control valves 140 and 142 is switchable between a first valve position for allowing a bidirectional flow of the fluid and a second valve position for allowing a flow of the fluid from the junction 133 or 136 to the wheel brake 134 or 137 while preventing a reverse flow.

Electromagnetic directional control valves 144 and 143, each of which is switchable between a first valve position for allowing bidirectional flow of the fluid and a second valve position for allowing flow of the fluid from the wheel brake 135 or 138 to the junction 133 or 136 while preventing reverse flow, are connected in the pipelines between the junction 133 and the wheel brake 135 for the right rear wheel and between the junction 136 and the wheel brake 138 for the left rear wheel respectively.

An auxiliary power circuit 146, which sucks working fluid from a reservoir 145 to pressurize the circuit 146 communicates with the respective wheel brakes 138, 135, 134 and 137, and electromagnetic directional control valves 147, 148, 149 and 150 are connected in pipelines connecting the auxiliary power circuit 146 with the wheel brakes 138, 135, 134 and 137 respectively. Electromagnetic directional control valves 154, 155, 152 and 153 are connected in a drain circuit 151, which connects the respective wheel brakes 134, 137, 138 and 135 with the reservoir 145.

In order to perform a general brake operation by operating the brake pedal 131, the electromagnetic directional control valves 139, 140, 141, 142, 143 and 144 are brought into the first valve positions as shown in FIG. 9, respectively.

In order to perform an antilocking control when the brake pedal 131 is operated, the electromagnetic directional control valves 139, 141, 143 and 144 are brought into the second valve positions and the electromagnetic directional control valves 140 and 142 are brought into the first valve positions as shown in FIG. 9. When the operating force of the brake pedal 131 is relaxed in this state, the brake pressure applied to each wheel brake is reduced.

In order to perform a traction control in a state when the brake pedal 131 is not operated, the electromagnetic directional control valves 140 and 142 are brought into the second valve positions and the electromagnetic directional control valves 139, 141, 143 and 144 are brought into the first valve positions as shown in FIG. 9. When the brake pedal 131 is operated in this state, the brake pressure applied to each wheel brake is increased.

The electromagnetic directional control valve 64 as shown in FIG. 4 may be provided in the pipeline connecting the wheel brake for each driving wheel and the master cylinder, although the same is not shown in FIG. 9. Further, the electromagnetic directional control valve 74 and the directional control valve 75 as shown in FIG. 6 may be provided in the pipeline connecting the wheel brake for each driving wheel and the master cylinder.

Figure 1:
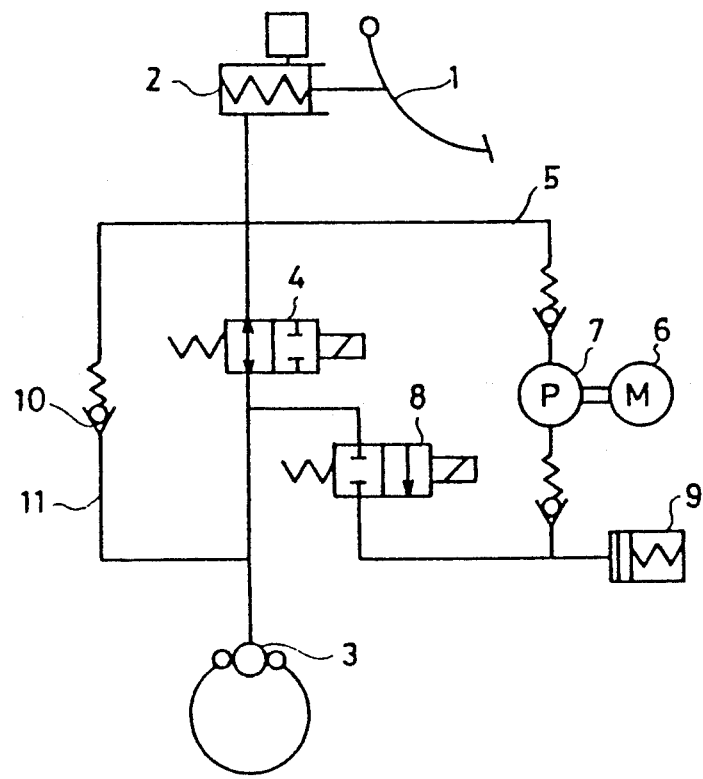
FIG. 1 is a hydraulic pressure circuit diagram of a brake pressure control device as shown in U.S. Pat. No. 3,617,098.
Figure 10A:
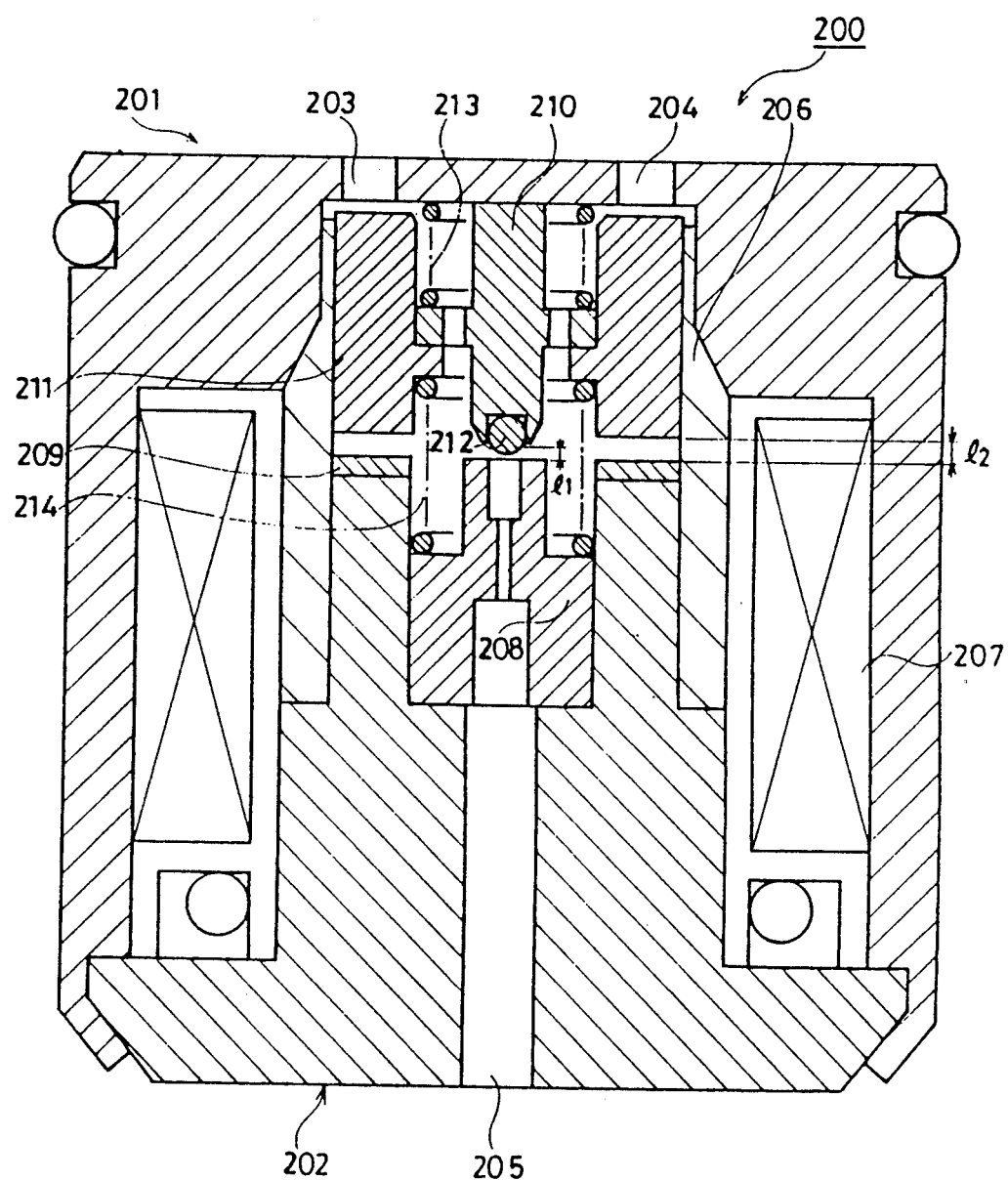
FIGS. 10A and 10B are sectional views showing the structure of an electromagnetic directional control valve 24 or 34 symbolically shown in FIG. 2 or 3, with FIG. 10A showing a state in which a coil is fed with no electricity and FIG. 10B showing a state in which the coil is fed with electricity.
Figure 10B:
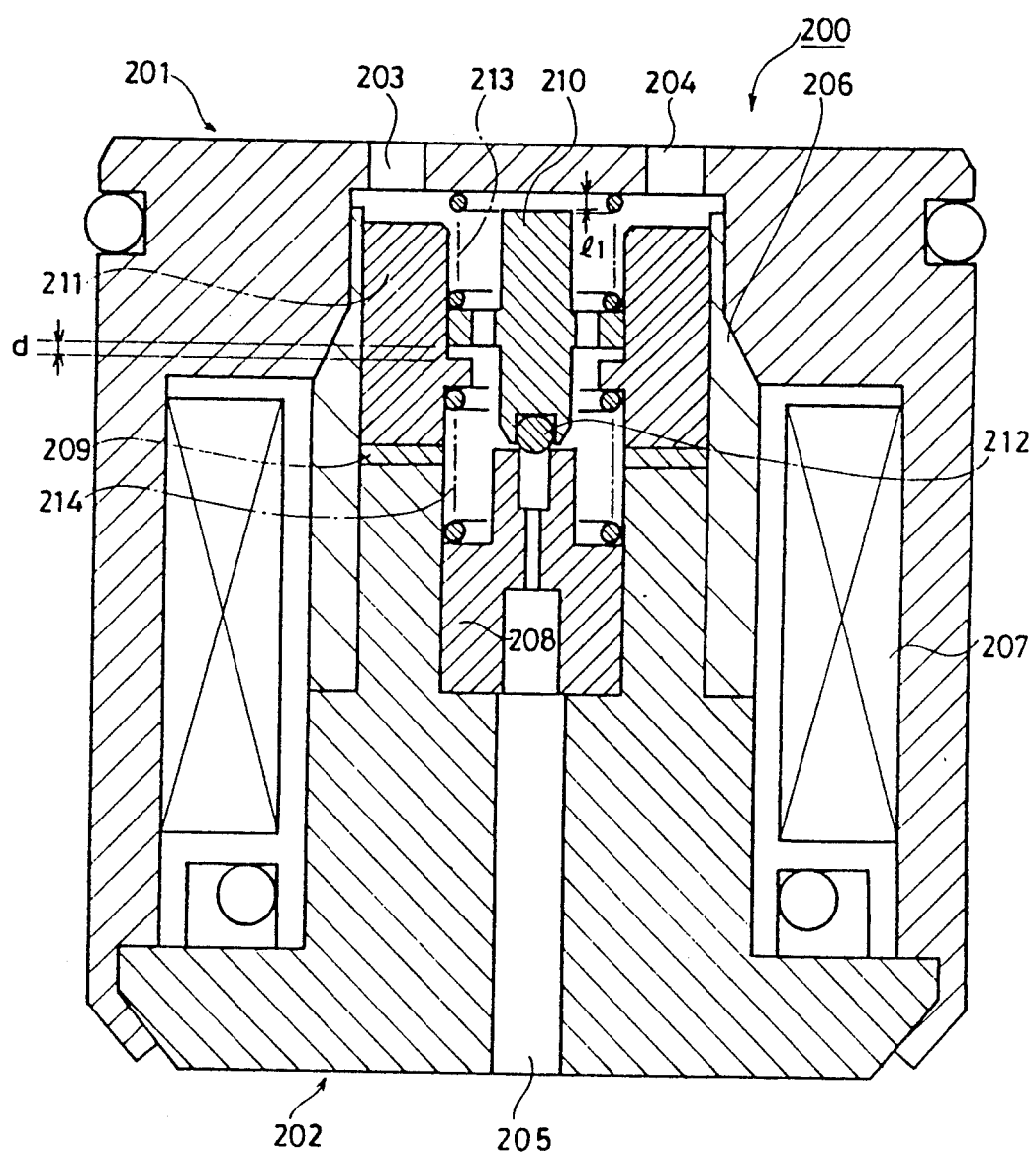

FIGS. 10A and 10B are illustrative of a concrete example of the electromagnetic directional control valve 24 as shown in FIG. 1 or the electromagnetic directional control valve 34 as shown in FIG. 2. An electromagnetic directional control valve 200 shown in FIGS. 10A and 10B figures is provided with a frame 201 and a stator 202 which is fixedly mounted in the frame 201. The frame 201 has ports 203 and 204, and the stator 202 has a port 205. A guide ring 206 of non-magnetic material is fixedly mounted around an upper part of the stator 202. Liquid tightness is maintained between the guide ring 206 and the frame 201. A coil 207 is provided around the stator 206, as shown in the figures.

A fixed valve seat 208 is press-fitted into the upper portion of the stator 202. An armature 211, which can be attracted toward the stator 202 by electromagnetic force, and a movable valve 210 are contained in a space between the stator 202 and the frame 201. The movable valve 210 is provided in its lower end portion with a globe valve portion 212, which is brought into contact with the fixed valve seat 208 to close a passage. As shown in the FIGS. 10A and 10B, a shim 209 of non-magnetic material is fixedly mounted on an upper end portion of the stator 202, to adjust a clearance between the stator 202 and the armature 211.

A return spring 214 is effective between the fixed valve seat 208 and the armature 211. This return spring 214 continuously urges the armature 211 to move upwardly. A relief spring 213 is effective between the movable valve 210 and the frame 201, to continuously urge the movable valve 210 thereby to downwardly move the same in FIGS. 10A and 10B. The spring force of the relief spring 213 is extremely small as compared with the return spring 214. Further, a movable distance $l_2$ of the armature 211 is larger than a movable distance $l_1$ of the movable valve 210.

FIG. 10A shows a state in which the coil 207 is deenergized. FIG. 10B shows a state in which the coil 207 is energized. It is assumed here that the ports 203 and 204 of the frame 201 communicate with a master cylinder and the port 205 of the stator 202 communicates with a wheel brake. When the coil 207 is not energized as shown in FIG. 10A, the armature 211 is moved upwardly by the spring force of the return spring 214. The armature 211 is thus in contact with a flange portion of the movable valve 210 thereby to move the same in an upward direction. The armature 211 and the movable valve 210 are thus moved upwardly until an upper end portion of the movable valve 210 contacts the frame 201. In the state as shown in FIG. 10A, the globe valve portion 212 of the movable valve 210 is in a position separated from the fixed valve seat 208. Therefore, flow of fluid from the master cylinder to the wheel brake is allowed and a reverse flow, i.e., flow of the fluid from the wheel brake to the master cylinder, is also allowed.

On the other hand, when the coil 207 is energized as shown in FIG. 10B, the armature 211 is attracted and moved toward the stator 202. This movement is performed until the armature 211 contacts the shim 209. The movement stroke of the armature 211 is rendered larger than that of the movable valve 210. Therefore, when the movable valve 210 is downwardly by the relief spring 213 so that the globe valve portion 212 contacts the fixed valve seat 208, a clearance d ($=l_2-l_1$) is defined between the flange portions of the movable valve 210 and the armature 211.

In the state as shown in FIG. 10B, a flow of the fluid from the wheel brake to the master cylinder, i.e., flow of the fluid from the port 205 to the ports 203 and 204 is allowed since the spring force of the relief spring 213 is weak. On the other hand, a reverse flow of the fluid, i.e., flow of the fluid from the ports 203 and 204 to the port 205 is prevented.

A brake pressure control device employing such an electromagnetic directional control valve as shown in FIGS. 10A and 10B simplifies the circuit structure and the pipe arrangement. However, the electromagnetic directional control valve as shown in FIGS. 10A and 10B can be further improved.

When the electromagnetic directional control valve is energized and the fluid in the armature 211 side, i.e., the fluid in the ports 203 and 204 is under a higher pressure than the fluid in the stator 202 side, i.e., the fluid in the port 205, the movable valve 210 is in contacts the fixed valve seat 208 to hold it in a closed state. When the electromagnetic directional control valve is deenergized in the same fluid pressure relation, i.e., in the state wherein the fluid in the armature 211 side is retained at a high pressure level, the following conditions must be satisfied for separating the movable valve 210 from the fixed valve seat 208 thereby to open the valve. The return spring 214 urges the movable valve 210 in a valve-opening direction. On the other hand, the relief spring 213 and a hydraulic pressure force acting on the effective sealing areas of the movable valve 210 and of the fixed valve seat 208, and a residual magnetic force urge the movable valve 210 in a valve-closing direction. Therefore, even if the electromagnetic directional control valve is deenergized, the movable valve 210 is held in the closed state unless the force urging the movable valve 210 in the valve-opening direction exceeds the force urging the same in the valve-closing direction Thus, a delay may be caused in the valve opening when the electromagnetic directional control valve is deenergized.

In order to reduce such valve opening delay in the aforementioned deenergized state, the spring force of the return spring 214 may be increased. In this case, however, a delay in the valve opening is increased when the electromagnetic directional control valve is energized. Thus, it is difficult to attain a quick response on both of the energized and deenergized states of the electromagnetic directional control valve as shown in FIGS. 10A and 10B.

Figure 11:
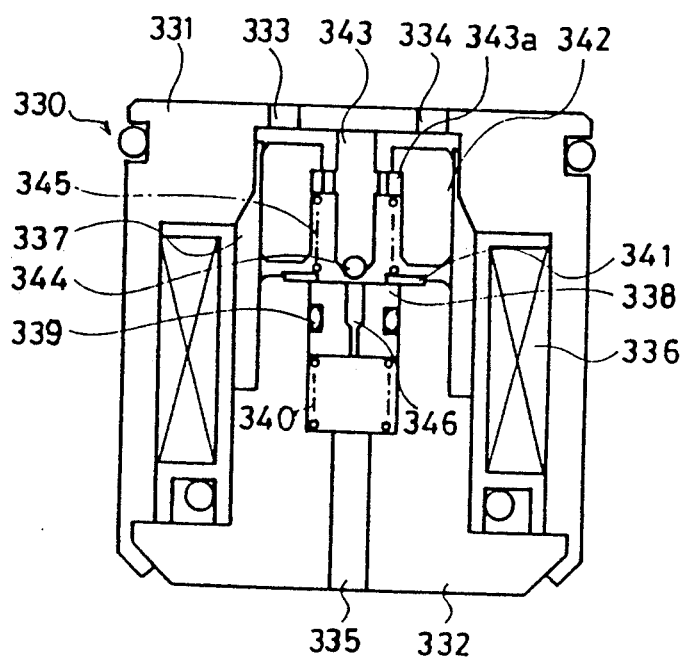
FIG. 11 is a sectional view showing another example of an electromagnetic directional control valve according to the present invention.
Figure 12:
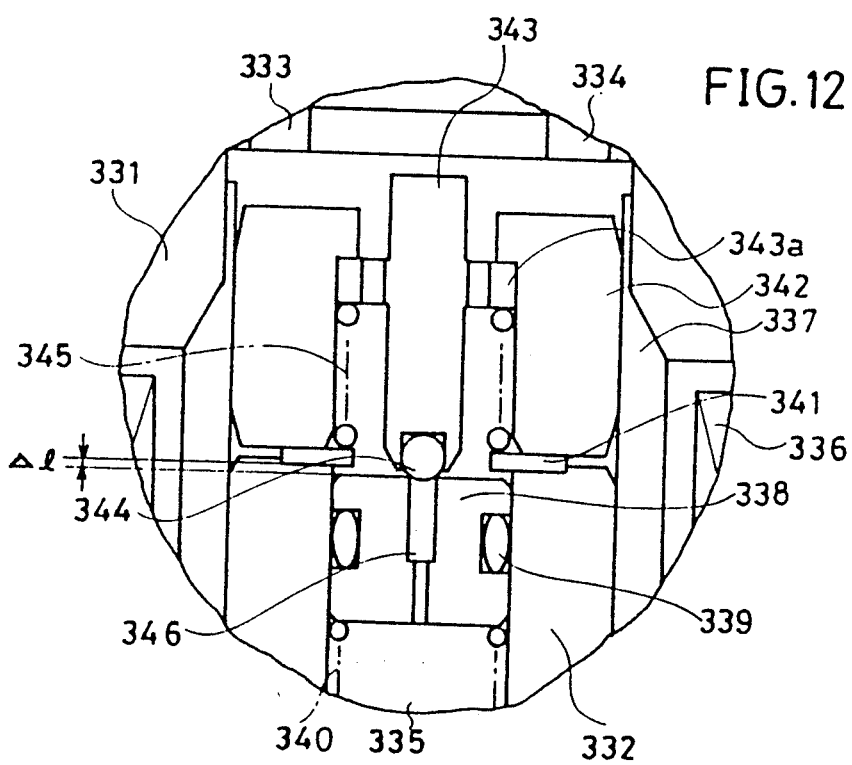
FIG. 12 is a partially enlarged sectional view of the electromagnetic directional control valve as shown in FIG. 11.

FIG. 11 is a sectional view showing an electromagnetic directional control valve which has an excellent quick response in both, the energized and in the deenergized states, and FIG. 12 is a partially enlarged sectional view thereof.

This electromagnetic directional control valve 330 has a frame 331 and a stator 332 which is fixedly engaged into the frame 331. The frame 331 is provided with ports 333 and 334, and the stator 332 is provided with an axially extending passage 335. In an exemplary application, the passage 335 of the stator 332 communicates with a master cylinder and the ports 333 and 334 of the frame 331 communicate with wheel brakes.

A guide ring 337 of non-magnetic material is fixedly press-fitted around an upper portion of the stator 332. Liquid tightness is maintained between the guide ring 337 and the stator 332 as well as between the guide ring 337 and the frame 331. An electromagnetic coil 336 is arranged around the stator 332, as shown in FIGS. 11 and 12.

A valve seat 338 and a second spring 340 are provided in the passage 335 of the stator 332. The valve seat 338 has a passage 346 within the same and a sealing member 339 in its outer peripheral surface. The sealing member 339 is adapted to maintain liquid tightness between the valve seat 338 and the stator 332. The valve seat 338 is slidable within the passage 335 of the stator 332 while maintaining a liquid seal with respect to the stator 332. The second spring 340 urges the valve seat 338 upwardly in FIGS. 11 and 12. A retainer 341 of non-magnetic material is fixedly mounted on an upper end portion of the stator 332. Thus, the valve seat 338 is urged by the second spring 340 into contact with the retainer 341, whereby an upward movement thereof is stopped.

An armature 342, which can be attracted toward the stator 332 by electromagnetic force, and a movable valve 343 are contained in a space between the stator 332 and the frame 331. A flange portion 343a of the movable valve 343 is fixedly press-fitted with the armature 342, whereby the armature 342 and the movable valve 343 are integrally moved. The movable valve 343 has a globe valve portion 344 which is brought into contact with the valve seat 338 to close the passage 346. The armature 342 is guided to slide by a bore surface of the guide ring 337.

A first spring 345 is located between the flange portion 343a of the movable valve 343 and the retainer 341 which is fixed to the upper end portion of the stator 332. The first spring 345 urges the movable valve 343 and the armature 342 to separate the same from the stator 332.

The distance of movement of the movable valve 343 to be in contact with the valve seat 338 in energized state is made smaller than a distance of movement of the armature 342 which is attracted by the stator 332. FIG. 11 shows a state in which the coil 336 is not energized and FIG. 12 shows a state in which the coil 336 is energized.

When the coil 336 is not energized as shown in FIG. 11, the movable valve 343 and the armature 342 are moved upwardly by a force of the first spring 345. The movable valve 343 and the armature 342 are thus upwardly moved until the upper end portion of the movable valve 343 contact with contacts with the frame 331. In the state as shown in FIG. 11, the globe valve portion 344 of the movable valve 343 is in a position separate from the valve seat 338. Thus, in the deenergized state as shown in FIG. 11, a flow of fluid from the master cylinder to each wheel brake is allowed and a reverse flow, i.e., flow from each wheel to the master cylinder is also allowed.

On the other hand, when the coil 336 is energized as shown in FIG. 12, the armature 342 is attracted and moves toward the stator 332. The armature 342 is thus moved until it contacts the retainer 341. As described above, the distance of movement of the movable valve 343 to be in contact with the valve seat 338 in the fed state is made smaller than the distance of movement of the armature 342 which is attracted by the stator 332. Thus, the movable valve 343 is first brought into contact with the valve seat 338 to close the passage 346 during movement of the armature 342. Upon further movement of the armature 342, the movable valve 343 urges the valve seat 338 downwardly in FIGS. 11 and 12 against a force of the second spring 340, while maintaining a valve-opening state. Thus, the valve seat 338 is separated from the retainer 341 by a distance Δl in the energized as shown in FIG. 12.

In the state as shown in FIG. 12, a flow of the fluid from the passage 335 to the ports 333 and 334 is prevented. On the other hand, a flow of the fluid from the ports 333 and 334 to the passage 335 is allowed when hydraulic pressure acting on the effective sealing areas of the movable valve 343 and the valve seat 338 urges the valve seat 338 in a valve-opening direction and the hydraulic pressure exceeds the spring force of the second spring 340.

Thus, the electromagnetic directional control valve 330 as shown in FIGS. 11 and 12 allows a bidirectional flow of the fluid in the deenergized state. Further, the same allows unidirectional flow of the fluid while preventing a reverse flow of the fluid upon being deenergized.

Further, the electromagnetic directional control valve 330 as shown in FIGS. 11 and 12 does not cause any such problem as has occurred in the electromagnetic directional control valve as shown in FIGS. 10A and 10B. It is assumed here that the passage 335 side is at a high pressure level and the ports 333 and 334 are at low pressure levels in the fed state as shown in FIG. 12. In this case, fluid pressure acting on a sealing effective area between the movable valve 343 and the valve seat 338 urges the movable valve 343 in the valve-opening direction. Therefore, when the electromagnetic directional control valve 330 is deenergized, the movable valve 343 is subjected to urging force by an the fluid pressure in addition to the spring force by the first spring 345, to be immediately moved to a valve-opening position. Thus, the electromagnetic directional control valve 330 as shown in FIGS. 11 and 12, can attain a quick response for changing from the energized state to the non-energized state.

Further, the force of the first spring 345 may not be increased to attain a quick response in the deenergized state. Thus, a quick response can be attained also when changing from the deenergized state to the energized state.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a brake pressure control system for vehicles, wherein a master cylinder is connected to a wheel brake through a hydraulic main pipeline, wherein a normally closed discharge valve is disposed in a hydraulic discharge pipeline branching from said main pipeline, wherein said discharge valve is switchable into any one of a first plurality of valve positions by first electromagnetic drive means, and wherein an auxiliary power source is connected through a hydraulic auxiliary pipeline to said main pipeline for introducing at any time an auxiliary pressure into said main pipeline, the improvement comprising a pipeline junction interconnecting said main pipeline, said discharge pipeline, said auxiliary pipeline, and said wheel brake, electromagnetic directional control valve means connected in said main pipeline between said pipeline junction and said master cylinder, and second electromagnetic drive means connected to said directional control valve means for switching said directional control valve means into any one of a second plurality of valve positions where in one of said second plurality of valve positions includes a check valve means arranged for an isolation function in one of said second valve positions by allowing fluid flow from said master cylinder to said wheel brake while preventing fluid flow in the opposite direction.

2. The brake pressure control system of claim 1, wherein said directional control valve means comprise first and second electromagnetic directional control valves connected in series with each other in said main pipeline, one of said electromagnetic directional control valves being switchable between a first valve position for allowing a bidirectional flow of said fluid and a second valve position for allowing flow of said fluid from said wheel brake to said master cylinder while preventing a reverse flow, and the other of said electromagnetic directional control valves being switchable between a first valve position for allowing a bidirectional flow of said fluid and a second valve position for allowing a flow of said fluid from said master cylinder to said wheel brake while preventing a reverse flow to provide said isolation function.

3. The brake pressure control system of claim 2, wherein said wheel brake is a wheel brake for a driving wheel.

4. The brake pressure control system of claim 1, wherein said second plurality of valve positions of said electromagnetic directional control valve means includes a first valve position, a second valve position and a third valve position, whereby a bidirectional fluid flow is allowed when said electromagnetic directional control valve means is in said first valve position, a fluid flow from said master cylinder to said wheel brake is allowed and reverse fluid flow is prevented when said electromagnetic directional control valve means is in said second valve position, and a fluid flow from said wheel brake to said master cylinder is allowed and reverse fluid flow is prevented when said electromagnetic directional control valve means is in said third valve position.

5. The brake pressure control system of claim 4, wherein said wheel brake is a wheel brake for a driving wheel.

6. The brake pressure control system of claim 1, wherein said electromagnetic directional control valve means comprise two control valves connected for cooperation with each other, one of said control valves being switchable between a first valve position for allowing a fluid flow from said master cylinder to said wheel brake while preventing a reverse fluid flow, and a second valve position for allowing a fluid flow from said wheel brake to said master cylinder while preventing a respective reverse fluid flow, the other control valve being switchable between a first valve position for allowing a bidirectional fluid flow and a second valve position for preventing said bidirectional fluid flow.

7. The brake pressure control system of claim 6, wherein said two control valves are connected in parallel with each other in said main pipeline, and wherein said wheel brake is a wheel brake for a driving wheel.

8. The brake pressure control system of claim 1, wherein said directional control valve means comprise a pair of electromagnetic directional control valves connected in parallel with each other in said main pipeline, one of said electromagnetic directional control valves being switchable between a first valve position for allowing fluid flow from said master cylinder to said wheel brake while preventing reverse flow and a second valve position for preventing bidirectional fluid flow, and wherein the other valve of said electromagnetic directional control valves is switchable between a first valve position for allowing flow of said fluid from said wheel brake to said master cylinder while preventing reverse flow and a second valve position for preventing bidirectional fluid flow.

* * * * *

UNITED STATES PATENT AND TRADEMARK OFFICE
CERTIFICATE OF CORRECTION

PATENT NO. : 4,997,238
DATED : March 5, 1991
INVENTOR(S) : Teruhisa Kohno et al.

It is certified that error appears in the above-identified patent and that said Letters Patent is hereby corrected as shown below:

Column 14, line 53, replace "where in" by --wherein--;
Column 14, lines 55 and 56, delete "an isolation function in one of said second valve positions by".

Signed and Sealed this

Thirteenth Day of October, 1992

*Attest:*

DOUGLAS B. COMER

*Attesting Officer*     *Acting Commissioner of Patents and Trademarks*